United States Patent [19]

Plasko

[11] E Re. 29,430

[45] Reissued Oct. 4, 1977

[54] THERMAL LIMITER FOR ONE OR MORE ELECTRICAL CIRCUITS AND METHOD OF MAKING THE SAME

[75] Inventor: Emil Robert Plasko, Dayton, Ohio

[73] Assignee: Emerson Electric Co., St. Louis, Mo.

[21] Appl. No.: 565,217

[22] Filed: Apr. 4, 1975

Related U.S. Patent Documents

Reissue of:

[64] Patent No.: 3,649,942
Issued: Mar. 14, 1972
Appl. No.: 101,848
Filed: Dec. 28, 1970

U.S. Applications:

[63] Continuation-in-part of Ser. No. 62,369, Aug. 10, 1970, abandoned.

[51] Int. Cl.[2] ..... H01H 85/02

[52] U.S. Cl. ..... 337/163; 337/166; 337/186; 337/222

[58] Field of Search ..... 337/163, 164, 165, 166, 337/182, 186, 222; 219/501

[56] References Cited

U.S. PATENT DOCUMENTS

| | | | |
|---|---|---|---|
| 1,361,396 | 12/1920 | Mooers et al. | 337/184 |
| 2,488,049 | 11/1949 | Bolesky | 337/365 |
| 2,672,542 | 3/1954 | Fisher | 337/163 |
| 2,789,182 | 4/1957 | Baenziger | 337/165 |
| 3,309,481 | 3/1967 | Merrill | 337/403 |
| 3,342,964 | 9/1967 | Kozacka | 337/164 |
| 3,426,306 | 2/1969 | Scheidill et al. | 337/102 X |
| 3,581,062 | 5/1971 | Aston | 219/501 |
| 3,924,214 | 12/1975 | Plasko | 337/163 |

FOREIGN PATENT DOCUMENTS

| | | | |
|---|---|---|---|
| 417,732 | 2/1967 | Switzerland | 337/163 |
| 515,747 | 6/1937 | United Kingdom | 337/164 |

OTHER PUBLICATIONS

Gibson Master Refrig. Service Manual 1966–1970 models, Gibson Products Corp.

*Primary Examiner*—George Harris
*Assistant Examiner*—Fred E. Bell
*Attorney, Agent, or Firm*—Biebel, French & Nauman

[57] ABSTRACT

This invention relates to a thermal limiter which can be used to limit one or more electrical circuits, such as multiple circuits in which one of the circuits is a primary circuit and the other circuits are secondary circuits energized or controlled by the primary circuit. The limiter of this invention is a unitary construction which can be connected to the primary and secondary circuits to control the same. A new method of making the limiter is included in this invention. This invention can be used in combination with a transformer for a television set in combination with its primary and secondary circuits, in combination with an air conditioning system, such as for automobiles, or in combination with other devices, as desired.

9 Claims, 21 Drawing Figures

INVENTOR.
EMIL ROBERT PLASKO

BY Candor, Candor & Tassone

HIS ATTORNEYS

INVENTOR.
EMIL ROBERT PLASKO

BY
Cauda, Cauda & Tarone

HIS ATTORNEYS

INVENTOR.
EMIL ROBERT PLASKO

BY

Cauder, Cauder & Tassone

HIS ATTORNEYS

INVENTOR.
EMIL ROBERT PLASKO

BY

Cauda, Cauda & Tassone

HIS ATTORNEYS

THERMAL LIMITER FOR ONE OR MORE ELECTRICAL CIRCUITS AND METHOD OF MAKING THE SAME

Matter enclosed in heavy brackets [ ] appears in the original patent but forms no part of this reissue specification; matter printed in italics indicates the additions made by reissue.

This application is a continuation-in-part application of its copending parent patent application, Ser. No. 62,369, filed Aug. 10, 1970, since abandoned and which was assigned to the same assignee to whom this application is assigned.

This invention relates to a thermal limited for one or more electrical circuits.

For example, one embodiment of the thermal limiter of this invention can be used to limit multiple circuits in which a primary circuit energizes or controls one or more secondary circuits, such as a transformer having a primary circuit and secondary circuits. The limiter of this invention is a unitary construction which can be connected to such primary and secondary circuits in an efficient manner.

One feature of this invention is to provide a thermal limiter having a controlled delay action in the operation thereof to prevent accidental circuit limiting, such controlled delay action being provided by a fixed and controlled location of the heater element relative to the limiter sensing element as will be apparent hereinafter.

In addition, other features of the limiter of this invention is to permit the selection of the heater element in its output temperature, the selection of the sensing element for the required sensed temperature for opening the circuit, and the selection of the desired characteristics of the insulating mass that secures the limiter parts together, such characteristics being the thermal conductivity of the mass material, the size of the mass utilized, etc. Other selectable variables of the limiter of this invention will be apparent hereinafter.

For example, such a thermal limiter of this invention for at least one electrical circuit comprises a thermally responsive fuse and lead means operatively interconnected to the fuse for coupling the fuse in a desired electrical circuit. An electrical circuit heater means is disposed in a selected position relative to the fuse and an insulating mass covers and secures the heater means and the fuse in such selected position thereof with the lead means having at least portions thereof exposed from the mass whereby the insulating mass and the selected positioning of the heater means relative to the fuse, once the desired variables of the fuse, mass and heater have been selected, provides a controlled time delay in the heater means being adapted to cause the fuse to blow and thereby open the one electrical circuit.

This invention also includes a method of making the limiter of this invention.

Many other features, advantages and objects will become obvious from this description, the appended claimed subject matter, and the accompanying drawings in which:

FIG. 10 and illustrates the structure of FIG. 10 after the insulating mass has been received in the housing means;

Figure 1:
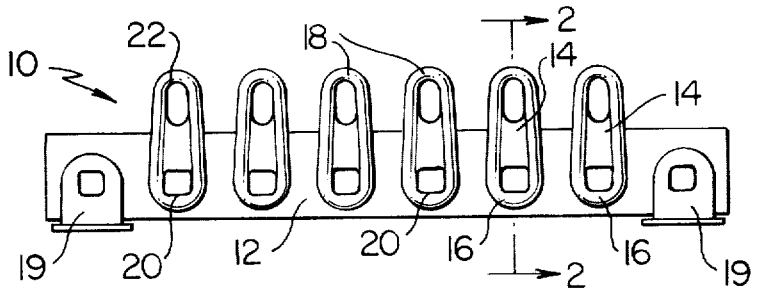
FIG. 1 is a side view of a plural circuit wire attachment toothed comb or comblike member to be used in this invention.
Figure 2:
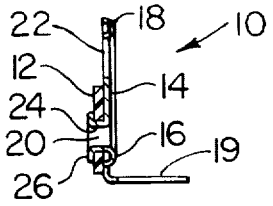
FIG. 2 is a cross section along the line 2—2.
Figure 3:
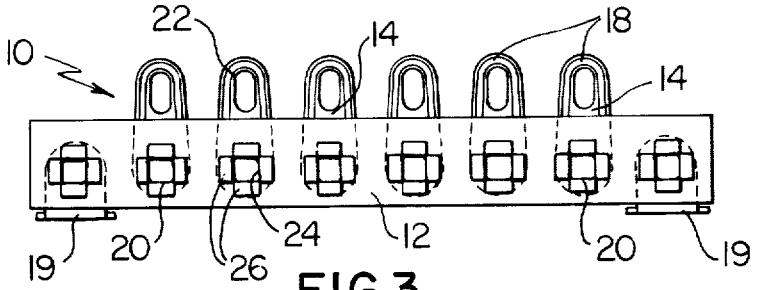
FIG. 3 is an opposite side view of FIG. 1.

A plural circuit wire attachment toothed comb or comblike member 10, FIGS. 1, 2 and 3, may be an article of manufacture now on the market and may have an electrically insulative base 12 carrying a plurality of electrically conductive wire attachment teeth or lead means 14. These teeth 14 may have wire attaching base supported tooth ends 16 secured to the base 12. The teeth 14 may also have wire attaching free tooth ends 18 extending away from said base 12.

The base 12 may be a relatively rigid insulative broad strip made of any suitable material.

The wire attachment teeth 14 may have wire attachment openings 20 embedded in said insulative base 12 and other wire attachment openings 22 at the free ends of the teeth.

The base 10 may be a stiff insulative strip of any suitable material to which the base supported tooth ends 16 are secured by hollow rivets 24. These hollow rivets may be square tubes punched out of the tooth ends 16 so that the tubes pass through the strip 10 and have their punched ends formed into rivets with outward tongues 26 for attachment of circuit wires thereto. The free ends 18 of the teeth may have the wire attachment openings 22 punched therein.

Suitable L-shaped support brackets 19 may be similarly riveted to the board strip or base 12.

Figure 4:
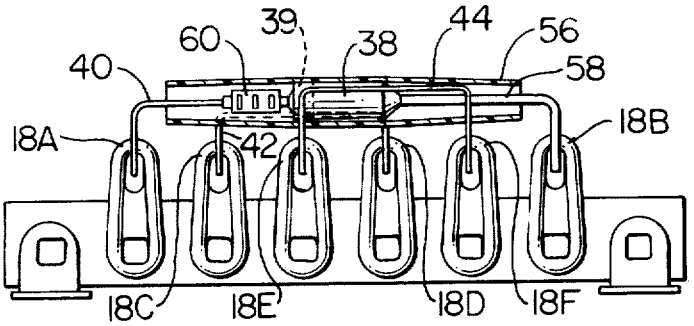
FIG. 4 is a view showing a partial assembly in the production of this invention and showing circuit wires secured to the free ends of the teeth of the comb members and with a thermally responsive fuse supported by two of said circuit wires.
Figure 5:
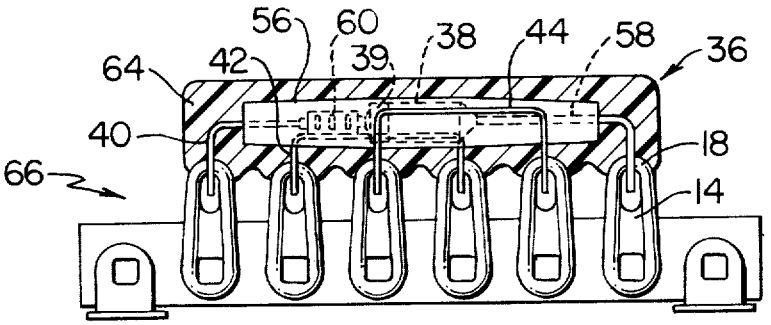
FIG. 5 is a view similar to FIG. 4, but showing a completed form of the invention.
Figure 5A:
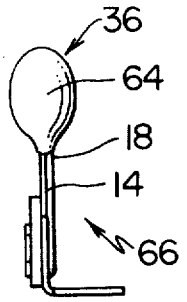
FIG. 5A is an end view of FIG. 5.

The article shown in FIGS. 1, 2 and 3 may be used in making the multiple circuit limiter shown in FIGS. 4, 5 and 5A which is suitable for simultaneously limiting or breaking multiple circuits such as the primary circuit 28 of a transformer arrangement 30 and one or more secondary circuits 32 and 34 of the transformer arrangement 30, which transformer may be a transformer for a television set.

The multiple circuit limiter or breaker shown in FIG. 5 may include an insulative coating structure 36 which covers and separates the various circuit wires which are mounted on the free ends 18 of the teeth 14. Such structure 36 may also cover a thermal fuse 38 and other parts to be described. The fuse 38 may be of the thermally collapsible pellet type with the pellet 39 at one end of the fuse, such as disclosed in P. E. Merrill U.S. Pat. No. 3,180,958, patented April 1965. The result is that the mass 36 may be heated by any one of the heating wires 40, 42 and 44 so that the heated mass 36 causes the thermal fuse 38 to open or blow the primary circuit 28 of the transformer 30 and thereby also deenergize the secondary circuits 32 and 34 and prevent damage to the transformer arrangement or the like.

It may be that one or more other secondary circuits 46 may be energized by the primary circuit 28 of transformer 30. However, such secondary circuit 46 may be of such current characteristics that it cannot be embodied in the mass 36. Under such conditions, a separate circuit breaker 48 may be provided in the secondary circuit 46 which has a thermal fuse 50. The wires 52 and/or pins 54 may be made with sufficient resistance to blow the fuse 50 and also break the one or more additional secondary circuits without breaking the transformer circuit arrangement previously described.

The insulative mass 36 may be formed as shown in FIGS. 4, 5 and 5A.

For example, any suitable insulative heat shrinkable sleeve 56, FIG. 4, may be placed around the fuse 38 and the circuit wires 40 and 58 also partly inside the sleeve 56 and extend out of said sleeve. The circuit wire 40 may be electrically resistive sufficiently to blow the fuse 38 when wire 40 is overloaded. The wire 58 is sufficiently conductive not to blow the fuse. A substantially electrically nonresistive splice 60 may connect wire 40 and fuse 38. The collapsible pellet 39 is sufficiently close to the heating wire 40 to be blown if the wire 40 is overloaded.

Thereafter, the ends of the wires 40 and 58 may be secured to the free tooth ends 18A and 18B.

Then a heating circuit wire 42 is placed adjacent to and outside the sleeve 56 and is secured to free tooth ends 18C and 18D so that the main body of heating wire 42 is sufficiently close to fuse 38 to blow the fuse if the wire 42 is overloaded.

Thereafter, a heating circuit wire 44 is placed adjacent to and outside sleeve 56 and also spaced from wire 42, but with its main body adjacent the fuse 38 sufficiently close to the fuse to blow the same if the wire 42 is overloaded. The ends of the wire 44 are secured to the free tooth ends 18E and 18F.

The insulative sleeve 56 may be made of any suitable heat shrinkable polyester such as mylar which is wrapped around parts of the wires 42 and 58 and is then lightly heat shrunk, if desired.

The assembly, as so far assembled in FIG. 4, is then dipped in any well known ceramic or epoxy cement to form the insulative mass 64 around the sleeve 56 and around the wires 40, 42, 44 and 58. The mass 64 may be somewhat oblong when viewed transversely, as in FIG. 5A, with parts extending to cover substantially all of said wires 40, 42, 44 and 58 and the free ends 18A, 18B, 18C, 18D and 18E of the comb teeth. In this manner, the solidified mass 64 holds the heating wires, 40, 32 and 34 in a fixed position relative to the pellet 39 of the fuse 38 for a purpose hereinafter set forth.

Figure 6:
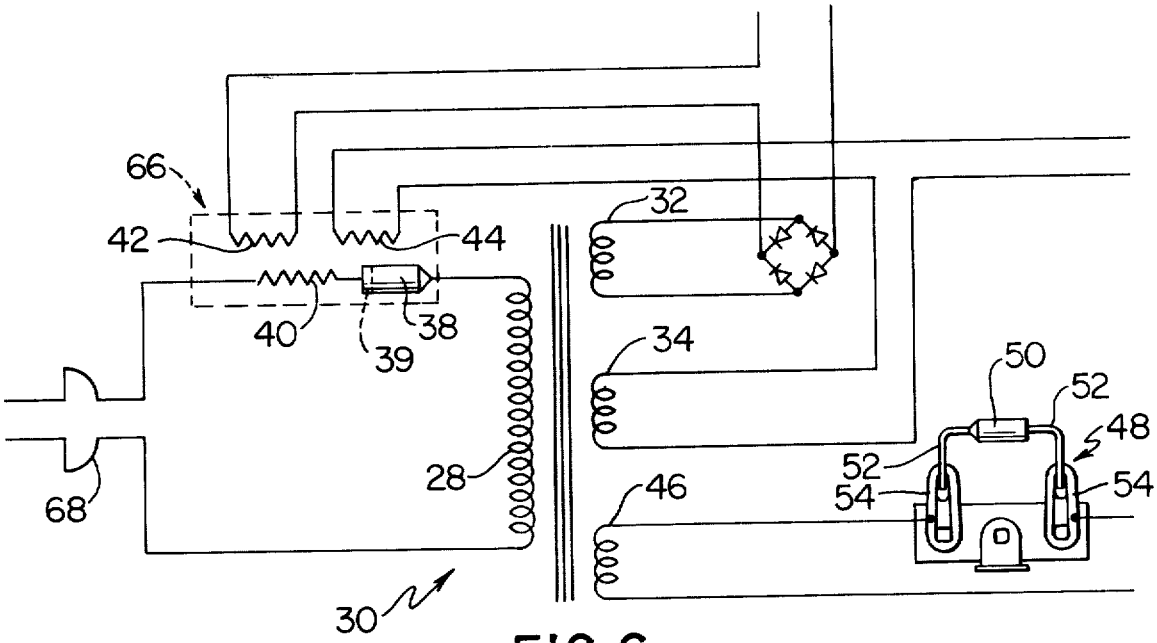
FIG. 6 is a diagrammatic view of the invention used as a multiple circuit temperature limiter in the circuit wires of a part of a transformer circuit.
Figure 7:
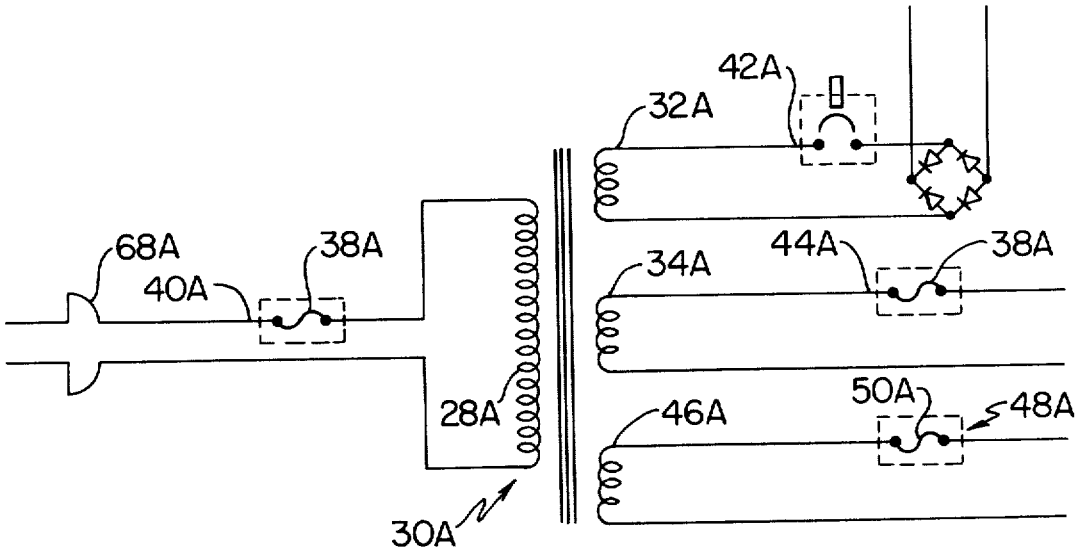
FIG. 7 is a diagrammatic view showing a transformer circuit somewhat similar to the circuit of FIG. 6 but in which the temperature is limited by separate limiters which can be eliminated by this invention.

FIG. 7 shows a transformer circuit somewhat similar to that shown in FIG. 6. However, the limiters in FIG. 7 are individual to their respective primary and secondary circuits. These limiters have been individually mounted within the television cabinet or the like in a manner to require experienced service means to provide service on the parts rather than permit the owner to try and correct a blown circuit by mere fuse replacement and not correct service on the malfunctioning part.

The parts on the circuit of FIG. 7 have been marked with reference numerals of FIG. 6 to indicate how the parts are unified by this invention.

In FIG. 6, the transformer primary circuit may be connected to a plug-in structure 68 so that the primary circuit energizes a plurality of secondary circuits 32, 34 and 46, or more.

The finished product shown in FIG. 5 may be placed anywhere in the primary circuit so that all the heater wires 40, 42 and 44 can heat the insulative mass 64 which acts as a heat sink in a controlled manner to cause the fuse 38 to blow if any of the heater wires are overloaded.

In particular, the position of the heating wires 40, 32 and 34 as held by the mass 64 in relation to the pellet 39 of the fuse as well as the heat conductive characteristics of the mass 64 are so selected that the fuse 38 will not immediately blow but will blow only after a certain time period from the initial heating of one or more wires 40, 32 and 34 and the continued heating thereof in order to prevent inadvertent blowing of the fuse 38 should the service man accidentally cause a temporary short circuiting by a screwdriver engagement during a service check, etc.

Any isolated secondary circuit such as 46 can be broken by an individual thermal fuse or current breaker 48.

Thus, it is to be seen that this invention includes an improved multiple circuit thermal limiter 66, FIG. 5, which can be combined with a multiple circuit such as a transformer circuit as shown in FIG. 6. An efficient method of making such limiter is also provided.

Figure 13:
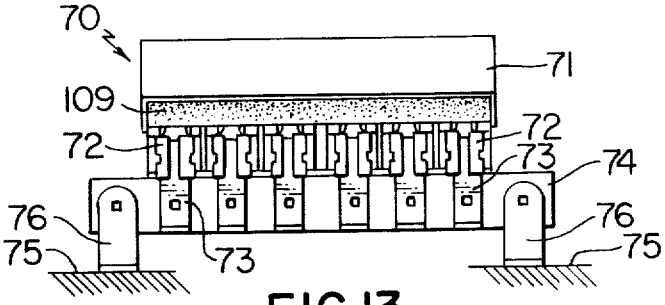
FIG. 13 is a side view of the completed multiple circuit thermal limiter of this invention as coupled to a plural circuit wire lead attachment means.
Figure 15:
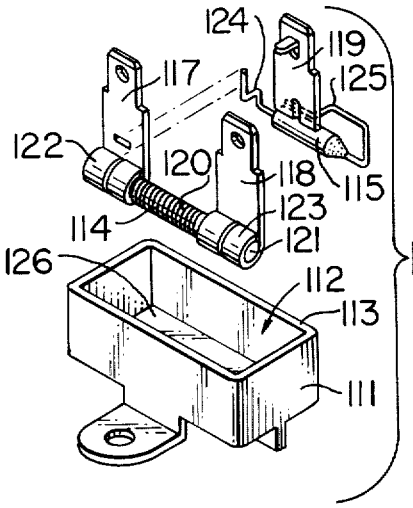
FIG. 15 is an exploded perspective view of the various parts forming the thermal limiter of FIG. 14.

Another multiple circuit thermal limiter of this invention is generally indicated by the reference numeral 70 in FIG. 13 and comprises a housing means or base 71 formed of suitable insulating material and carrying a plurality of quick connect and disconnect sleevelike lead members 72 for effectively receiving bayonet type lead strips 73 carried on an electrically insulating base or strip 74 adapted to be mounted to a desired supporting structure 75 by suitable leg means 76 whereby the thermal limiter 70 of this invention is adapted to be coupled to the lead attachment strips 73 of the board or base 74 by merely having the lead sleeves 72 telescoped over the projecting portions of the lead strips 73 so that the thermal limiter 70 of this invention can be coupled into a desired circuit means interconnected to the lead strips 73 in a conventional manner.

Figure 8:
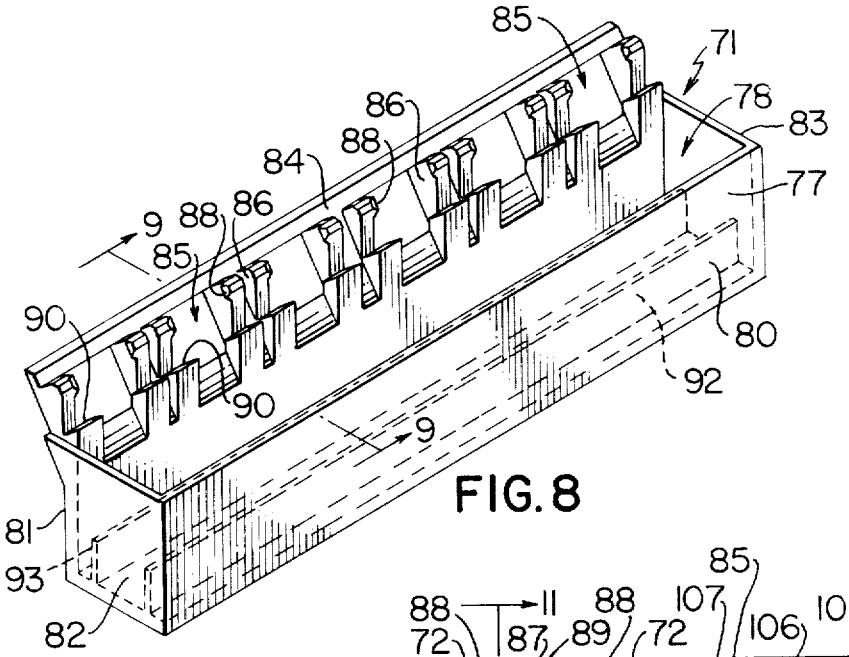
FIG. 8 is a top respective view of a housing structure for another multiple circuit thermal limiter of this invention.
Figure 9:
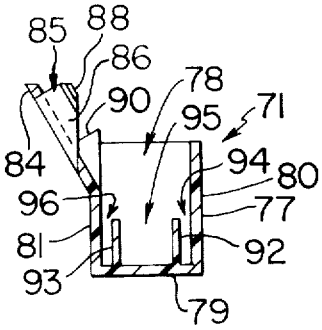
FIG. 9 is a cross-sectional view taken on line 9—9 of FIG. 8.
Figure 10:
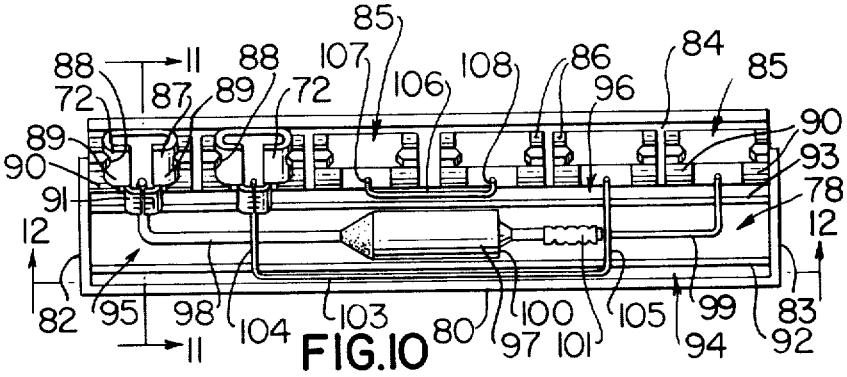
FIG. 10 is a top view of the housing structure illustrated in FIG. 8 and illustrates the fuse, heater wires and terminals assembled therein.

The multiple circuit thermal limiter 70 of this invention has the housing means 71 thereof provided with a substantially rectangular base portion 77 with a cavity 78 formed therein and defining a closed end wall means 79, opposed side wall means 80 and 81 and opposed end walls 82 and 83 of the housing means 71 with the side wall 81 having an extension 84 angled therefrom in the manner illustrated in FIGS. 8, 9 and 10. The angled wall 84 has a plurality of pockets 85 formed therein and defined between outwardly extending ridge means 86 utilized for snap fitting and retaining the sleevelike lead means 72 in a preassembled position relative thereto.

Figure 12:
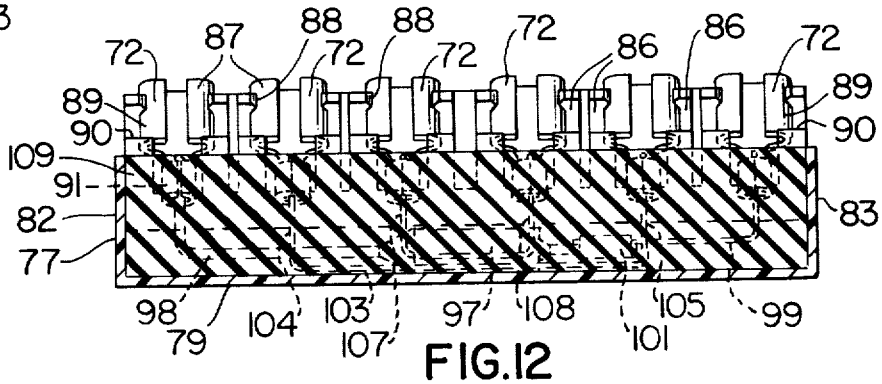
FIG. 12 is a cross-sectional view taken on line 12—12.

For example, each lead means 72 comprises an upper sleevelike portion 87 adapted to slip into a pocket means 85 under inwardly directed ears 88 of the cooperating ridge means 86 so as to be held flat against the angled wall 84 with the lower end 89 of the sleeve 87 abutting against locating shoulder means 90 on the ridge means 86 as illustrated in FIG. 12 whereby a lower wire attaching means 91 of the lead means 72 extends into the chamber or recess 78 of the housing means 71. In this manner, the sleevelike lead means 72 of the thermal limiter 70 can be disposed in the pocket means 85 of the housing means 71 so that the same will be uniformly positioned relative thereto by the stop means or shoulders 90 and ears 88 of the ridge means 86 whereby the sleevelike lead means 72 will be in proper positions relative to the lead strips 73 of the insulating base 74 when it is desired to couple a thermal limiter 70 of this invention thereto.

If desired, the spacing between the pockets 85 on the angled side wall 84 of the housing means 71 can be so spaced relative to each other that the same will be compatible with like spacing of the strips 73 on the insulating board 74 so that the thermal limiter 70 can be only coupled to the strips 73 on the board 74 when the limiter 70 is held in a certain position relative thereto so that wrong connecting to the board 74 will be prevented. For example, it can be seen that the spacing between the middle two sleeve members 72 of the thermal limiter 71 of this invention is greater than the spacing between any other adjacent pair of lead means 72 so as to be compatible with like spacing between the lead strips 73 on the base 74.

Figure 11:
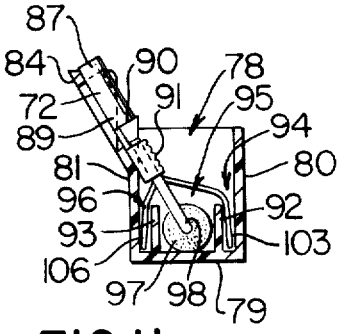
FIG. 11 is a cross-sectional view taken on line 12—1-1—11 of FIG. 10.

The end or bottom wall 79 of housing means 71 of the thermal limiter 70 has upwardly extending longitudinal dividers 92 and 93 formed integrally therewith and dividing the recess 78 into three chambers 94, 95 and 96 as illustrated in FIG. 11 whereby the chamber 95 is adapted to receive a temperature responsive fuse 97 formed in the same manner as the fuse 38 previously described and be electrically interconnected to the two outboard lead means 72 by supporting wires 98 and 99 as illustrated in FIG. 10, the wire 99 being a heater wire in the same manner as the heater wire 40 previously described and being coupled to the right side 100 of the fuse 97 by a substantially electrically nonresistive splice member 101 in the same manner as the splice member 60 previously described.

A heater wire 103 can be disposed in the chamber 94 and have its opposed ends 104 and 105 respectively interconnected to the next two inboard lead means 72. Another heater wire 106 is adapted to be disposed in the chamber 96 and have its opposed ends 107 and 108 respectively interconnected to the two innermost lead sleeves 72 as illustrated in FIGS. 10 and 12.

In this manner, it can be seen that the dividers 92 and 93 separate the heating wires 103 and 106 from the thermal fuse 97 as well as the lead attachment wires thereof during the assembly operation as illustrated in FIG. 10.

Thereafter, the desired insulative mass 109 is disposed in the recess 78 of the housing means 71 to fill the same to the desired level, which in the embodiment illustrated in the drawings is to the top of the end walls 82, 83 and side walls 77, so as to not only cover and secure the heating wires 99, 103 and 106 in the desired selective positioning thereof relative to the fuse 97 when the mass 109 hardens, but also to cover the lower ends 91 of the lead means 72 so as to secure the lead means 72 in their assembled relation in the pockets 85 so that the same cannot be subsequently moved relative to the housing means 71.

In this manner the completed thermal limiter 70 of this invention is adapted to be coupled to the lead board 74 in the manner previously described and be uncoupled thereto by merely telescoping or untelescoping the sleeve means 70 thereof to or from the lead strips 73 of the board 74 in a simple and effective manner.

Thus, it can be seen that the thermal limiter 70 of this invention is adapted to have the fuse 97 thereof open a circuit connected to the outermost pair of terminals 72 thereof when any one of the heating means 99, 103 and 106 generates sufficient heat to be conducted to the fuse 97 by the thermal mass 109 to cause the fuse 97 to blow, it being understood that the selection of the positioning of the heating wires relative to the fuse 97 as well as the conductive characteristics of the mass 109 are so selected that accidental blowing of the fuse 97 will not take place until the overloaded or short circuited condition is in existence for a length of time which would require circuit opening.

If desired, the thermal limiter 70 can be utilized in the same manner as the thermal limiter 66 previously described or in other circuit means for like purposes.

Another thermal limiter of this invention is generally indicated by the reference numeral 110 in FIG. 14 and comprises an electrically insulating housing means or base 111 having a recess 112 interrupting the top surface 113 thereof and receiving a heating means 114 and a thermal fuse 115 therein to be selectively positioned therein and subsequently covered and secured in such selective positioning by suitable insulating means or mass 116 so that three lead means 117, 118 and 119 respectively extend outwardly from the mass 116 for coupling the thermal limiter 110 in a desired circuit, such as the electrical circuit illustrated in FIG. 19 and hereinafter described.

The heating means 114 includes a heating wire 120 mounted on a rod 121 and has its opposed ends respectively interconnected to the terminals 117 and 118 having the lower portions 122 and 123 thereof disposed in coiled fashion about the rod 121 to be rigidly secured thereto.

Figure 16:
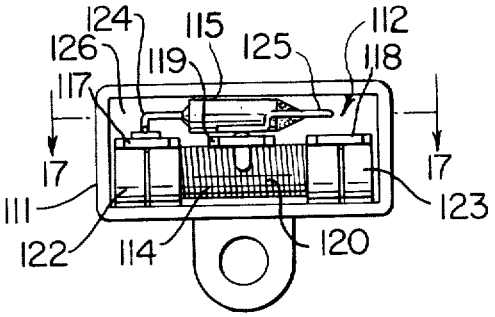
FIG. 16 is a top view of the parts of FIG. 15 in their assembled position and before the insulating mass has been disposed in the housing thereof.
Figure 18:
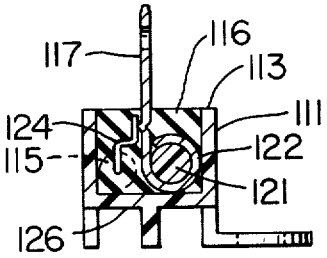
FIG. 18 is a cross-sectional view taken on line 18—18 of FIG. 17.

The thermal fuse 115, similar to fuse 38 previously described, has opposed lead wires 124 and 125 extending therefrom with the lead wire 125 being secured to the terminal means 119 and with the lead wire 124 being interconnected to the terminal 117 as illustrated, the wires 124 and 125 being of sufficient strength to support the fuse 115 in spaced relation relative to the heating means 114 in the manner illustrated in FIG. 16 when the same are disposed in the housing means 111 against a bottom wall means 126 thereof in the manner illustrated in FIG. 16 so that the insulating mass 116 can be subsequently disposed in the housing means 111 to cover and secure the fuse 115 and heating means 114 in the selected positioning thereof as illustrated, the insulating mass 116 being disposed between the fuse 115 and the heating means 114 as illustrated in FIG. 18 to provide insulation therebetween in the same manner as the divider walls 92 and 93 of the housing means 71.

Figure 14:
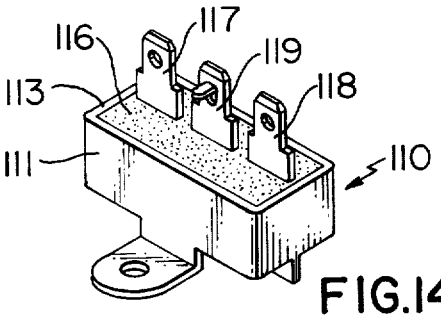
FIG. 14 is a top perspective view of another thermal limiter of this invention.
Figure 17:
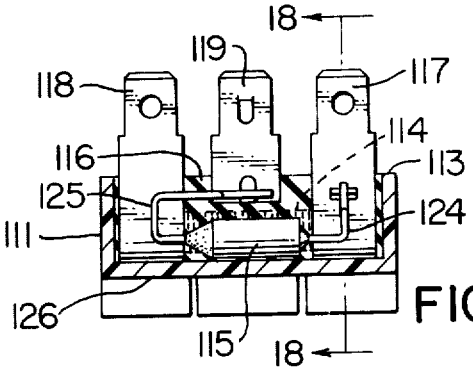
FIG. 17 is a cross-sectional view taken on line 17—17 of FIG. 16 and illustrates the thermal limiter after the insulating mass has been placed in the housing means of FIG. 16.
Figure 19:
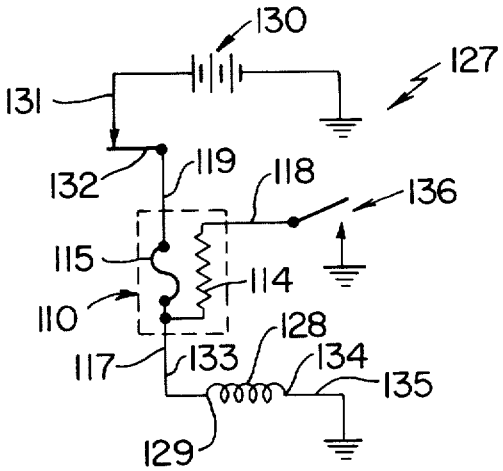
FIG. 19 is a schematic view illustrating an electrical circuit which can be utilized in combination with the thermal limiter of FIG. 14.

The thermal limiter 110 of FIG. 14 is adapted to be utilized in the particular electrical circuit 127 of FIG. 19 in a manner now to be described, but it is to be understood that the thermal limiter 110 can be utilized for other purposes as desired.

As illustrated in FIG. 19, the electrical circuit 127 is adapted to be utilized for an air conditioner or the like wherein an electrically operated drive clutch 128 is provided for the compressor and is adapted to have its side 129 interconnected to a suitable power source 130 by a lead means 131 interconnected by the conventional air conditioning on-and-off temperature responsive switch 132 to the terminal 119 of the thermal limiter 110 of this invention while the other terminal 117 thereof is interconnected by a lead 133 to the side 129 of the clutch 129 of the clutch means 128. The other side 134 of the clutch means 128 is interconnected by a lead 135 to ground in the same manner that the other side of the source 130 is interconnected to ground.

The terminal 118 of the terminal limiter 110 is interconnected to a loss-of-charge sensor switch 136 which is in a normally open condition as long as there is no loss of refrigerant of the air conditioning unit utilizing the circuit 127.

Thus, it can be seen that the electrically operated clutch means 128 is adapted to function as long as the switch 136 is in an open condition since the clutch means 128 is placed across the power source by the thermal limiter 110 of this invention when the switch 132 is closed to demand that the compressor be operating.

However, if the loss-of-charge switch 136 closes due to the refrigerant escaping from the refrigerant system, the compressor would burn out within a few minutes because the same would not receive sufficient lubrication whereby the heating means 114 now operatively interconnected to the source 130 will heat up sufficiently to cause the fuse 115 to blow and, thus, open the circuit that operates the clutch 128 so that the clutch 128 can no longer operate until the thermal limiter 110 is replaced.

However, in a normally performing air conditioning system, the loss-of-charge switch 136 can close for a minute or so under some unusual weather conditions whereby it would not be desired for the thermal limiter 110 to blow and, thus, require a serviceman to replace the same before the air conditioner can be operated. Thus, the thermal limiter 110 of this invention has been so constructed and arranged in the positioning of the heating means 114 relative to the fuse 115 as well as in the selection of the thermal mass 116 to permit the loss-of-charge switch 136 to be temporarily closed only for a minute or so without causing the fuse 115 to blow during the unusual weather conditions, but will assure that the fuse 115 will blow should the loss-of-charge switch 136 be closed for a time short of an adverse situation wherein the compressor would burn out or the like.

Thus, it can be seen that the thermal limiter 110 of this invention is adapted to protect an air conditioning system in the manner illustrated in FIG. 9 through a controlled time delay thereof.

Figure 20:
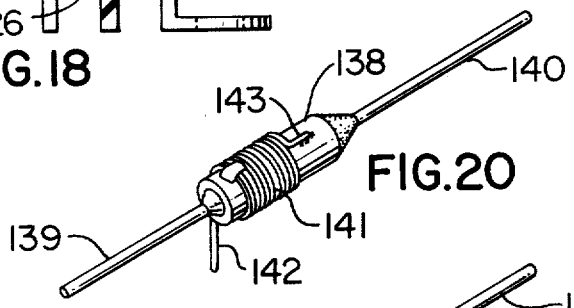
FIG. 20 is a perspective view of another thermal limiter of this invention before the same has been covered and secured in position by an insulating mass.
Figure 21:
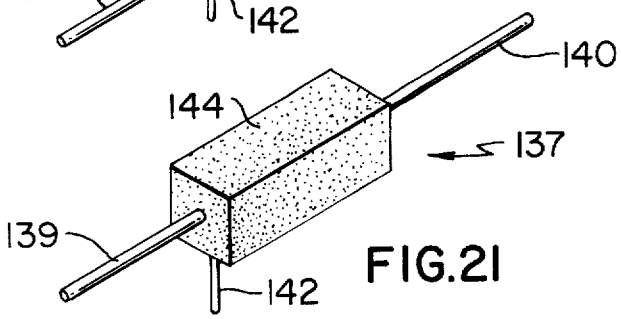
FIG. 21 illustrates the thermal limiter of FIG. 20 in its completed form after the insulating mass has been disposed thereon.

Another thermal limiter of this invention is generally indicated by the reference numeral 137 in FIG. 21 and is formed of the parts illustrated in FIG. 20 wherein a thermal fuse 138, similar to the fuse 38 previously described, has opposed leads 139 and 140 extending from opposed sides thereof for completing a circuit therethrough and has a heating wire 141 coiled upon the same with the opposed ends 142 and 143 of the heating wire 141 so disposed that the lead 143 is coupled to the fuse 138 in the same manner as the lead wire 139 whereas the lead wire 142 extends away from the fuse 138 as illustrated. Subsequently, an insulating mass 144, formed in any suitable shape, is disposed about the assembly illustrated in FIG. 20 so as to secure and cover the fuse 138 and heating wire 141 to hold the same in the selected positioning illustrated in FIG. 20 so that the lead means 139, 142 and 140 extend outwardly from the mass 144 for coupling into a desired circuit. For example, the thermal limiter 137 is adapted to be utilized in place of the thermal limiter 110 in FIG. 19 and serve the same function thereof wherein the lead 142 is interconnected to the loss-of-charge switch 136 and the leads 139 and 140 are adapted to be respectively interconnected to the on/off switch 132 and the electrical clutch 128.

In view of the above, it can be seen that this invention not only provides an improved thermal limiter wherein a controlled time delay thereof is provided by selective positioning of the heating means and the fuse together with the desired heat conductive characteristics of the securing mass, but also this invention provides an improved method of making such a thermal limiter or the like.

What is claimed is:

[1. A thermal limiter for at least one electrical circuit comprising a thermally responsive fuse, lead means operatively interconnected to said fuse for coupling said fuse in said circuit, an electrical circuit heater means disposed in a selected position relative to said fuse, and an insulating coating mass covering and securing said heater means and said fuse in said selected positioning thereof with said lead means having at least portions thereof exposed from said mass whereby said mass and said selected positioning provides a controlled time delay in said heater means being adapted to cause said fuse to blow and thereby open said one electrical circuit.]

[2. A thermal limiter as set forth in claim 1 wherein said heater means comprises a plurality of separate heater wires.]

[3. A thermal limiter as set forth in claim 1 wherein said heater means is spaced from said fuse, said mass being disposed between said heater means and said fuse and acting as a heat conductor therebetween.]

[4. A thermal limiter as set forth in claim 1 wherein said heater means comprises a heater wire coiled on said fuse.]

[5. A thermal limiter as set forth in claim 1 wherein said heater means comprises a heater wire disposed in series between one of said lead means and said fuse.]

[6. A thermal limiter as set forth in claim 1 wherein a housing means receives said heater means and said fuse therein in said selected positioning therebetween, said mass being disposed in said housing to cooperate with said housing to cover and secure said heater means and said fuse in said selected positioning thereof.]

[7. A thermal limiter as set forth in claim 6 wherein said heater means comprises a coiled heater wire having its opposed ends electrically interconnected to two lead means respectively having portions thereof exposed from said mass and from said housing means, said fuse having opposed sides thereof respectively electrically interconnected to said first mentioned lead means one of which is also one of said lead means electrically interconnected to said heater wire.]

[8. A thermal limiter as set forth in claim 1 wherein said lead means comprise a first pair of lead means respectively and electrically interconnected to opposed sides of said fuse, a second pair of lead means being respectively and electrically interconnected to opposed sides of said heater means and having portions thereof exposed from said mass.]

[9. A thermal limiter as set forth in claim 8 wherein said lead means comprise the teeth of a plural circuit wire attachment comb having an electrically insulative base carrying a plurality of electrically conductive wire attachment teeth with wire attaching base supported tooth ends secured to said base and with wire attaching free tooth ends extending away from said base and into said mass.]

10. A thermal limiter as set forth in claim [9] *26* wherein two supporting wires oppositely extend from said fuse to two of said free tooth ends which define said first pair of lead means, a sleeve of insulative shrink tubing surrounding said fuse with said two supporting wires extending from said sleeve, said tubing being embedded in said mass.

[11. A thermal limiter as set forth in claim 8 wherein said heater means comprises another electrical heater disposed in series between one of said first pair of lead means and said fuse.]

[12. A thermal limiter as set forth in claim 6 wherein said housing means has means locating said exposed parts of said lead means relative to each other.]

13. A thermal limiter as set forth in claim [12] *28* wherein said locating means space said lead means with at least one different spacing between adjacent lead means.

14. A thermal limiter as set forth in claim [12] *28* wherein said locating means comprise a wall of said housing means having a plurality of aligned and spaced pocket means therein respectively receiving said exposed portions of said lead means therein.

[15. A method making a thermal limiter for at least one electrical circuit comprising the steps of providing a thermally responsive fuse, operatively interconnecting lead means to said fuse for coupling said fuse in said circuit, disposing an electrical circuit heater means in a selected position relative to said fuse, and covering and securing said heater means and said fuse in said selected positioning thereof with an insulating mass so that said lead means have at least portions thereof exposed from said mass whereby said mass and said selected positioning provides a controlled time delay in said heater means being adapted to cause said fuse to blow and thereby open said one electrical circuit.]

[16. A method of making a thermal limiter as set forth in claim 15 and including the step of forming said heater means for a plurality of separate heater wires.]

[17. A method of making a thermal limiter as set forth in claim 15 wherein said step of disposing said heater means includes the step of spacing said heater means from said fuse, and disposing said mass between said heater means and said fuse to act as a heat conductor therebetween by said step of covering and securing.]

[18. A method of making a thermal limiter as set forth in claim 15 and including the step of forming said heater means from a heater wire and coiling said heater wire on said fuse.]

[19. A method of making a thermal limiter as set forth in claim 15 and including the step of forming said heater means from a heater wire and disposing said heater wire in series between one of said lead means and said fuse.]

[20. A method of making a thermal limiter as set forth in claim 15 and including the step of providing a housing means to receive said heater means and said fuse therein in said selected positioning therebetween, said mass being disposed in said housing to cooperate with said housing to cover and secure said heater means and said fuse in said selected positioning thereof.]

*21. A thermal limiter for at least one electrical circuit comprising a thermally responsive fuse of generally cylindrical configuration; lead means operatively interconnected to said fuse for coupling said fuse in said circuit; an electrical circuit heater means disposed in a selected position adjacent said fuse in substantially parallel relation therewith and comprising a coiled heater wire having its opposed ends respectively electrically interconnected and securely attached to two lead means comprising blade-like leads positioned in line with the axis of said coil and wrapped at least partially around the ends thereof; a housing means receiving said heater means and said fuse therein in said selected position; and an insulating coating mass disposed in and cooperating with said housing to cover and secure said heater means and said fuse in said selected positioning with all of said lead means having at least portions thereof exposed from said mass; whereby said mass and said selected positioning provides a controlled delay in the time between activating of said heater means and the blowing of said fuse to open said one electrical circuit.*

*22. A thermal limiter according to claim 21 wherein one of said blade-like leads is electrically interconnected to one side of said fuse.*

*23. A thermal limiter according to claim 22 wherein the end of said fuse which is remote from electrical connection to said heater means is connected to a blade-like lead, and said blade-like lead is disposed intermediate aforesaid two blade-like leads and is in alignment therewith.*

*24. A thermal limiter according to claim 22 wherein said mass is disposed between said heater means and said fuse to act as a heat conductor therebetween.*

*25. A thermal limiter for at least one electrical circuit comprising a thermally responsive fuse, a first pair of lead means electrically interconnected to opposed sides of said fuse, an electrical heater means disposed in a selected position relative to said fuse, a second pair of lead means electrically interconnected to opposed sides of said heater means, an insulating coating mass covering and securing said fuse in said selected positioning, and a plural circuit wire attachment comb comprising an electrically insulative base supporting a plurality of electrically conductive wire*

*attachment teeth, said base being spaced apart from said insulating coating mass and said teeth extending away from said base and into said mass for connection to said leads, whereby said mass and said positioning provides a controlled delay in the time between activating of said heater means and the blowing of said fuse to open said one electrical circuit.*

*26. A thermal limiter for at least one electrical circuit comprising a thermally responsive fuse, lead means operatively interconnected to said fuse for coupling said fuse in said circuit, an electrical heater means disposed in a selected position relative to said fuse, housing means for receiving and positioning said heater means and said fuse and including locating means for exposed parts of said lead means, and an insulating coating mass cooperating with said housing to cover and secure said heater means and said fuse in said selected positioning with all of said lead means having at least portions thereof exposed from said mass whereby said mass and said selected positioning provides a controlled delay in the time between activating of said heater means and the blowing of said fuse to open said one electrical circuit.*

* * * * *

UNITED STATES PATENT AND TRADEMARK OFFICE

CERTIFICATE OF CORRECTION

PATENT NO. : RE 29,430
DATED : October 4, 1977
INVENTOR(S) : Emil Robert Plasko

It is certified that error appears in the above-identified patent and that said Letters Patent are hereby corrected as shown below:

Column 1, line 17, "limited" should be --limiter--.

Column 2, line 24, "12-1-1-11" should be --11-11--.

Column 2, line 26, delete ";" and insert --of--.

Column 2, line 63, "broad" should be --board--.

Column 9, line 31, "26" should be --25--.

Column 9, line 45, "28" should be --26--.

Column 9, line 49, "28" should be --26--.

Signed and Sealed this

*Twenty-third* Day of *May 1978*

[SEAL]

*Attest:*

RUTH C. MASON
*Attesting Officer*

LUTRELLE F. PARKER
*Acting Commissioner of Patents and Trademarks*